1,559,308

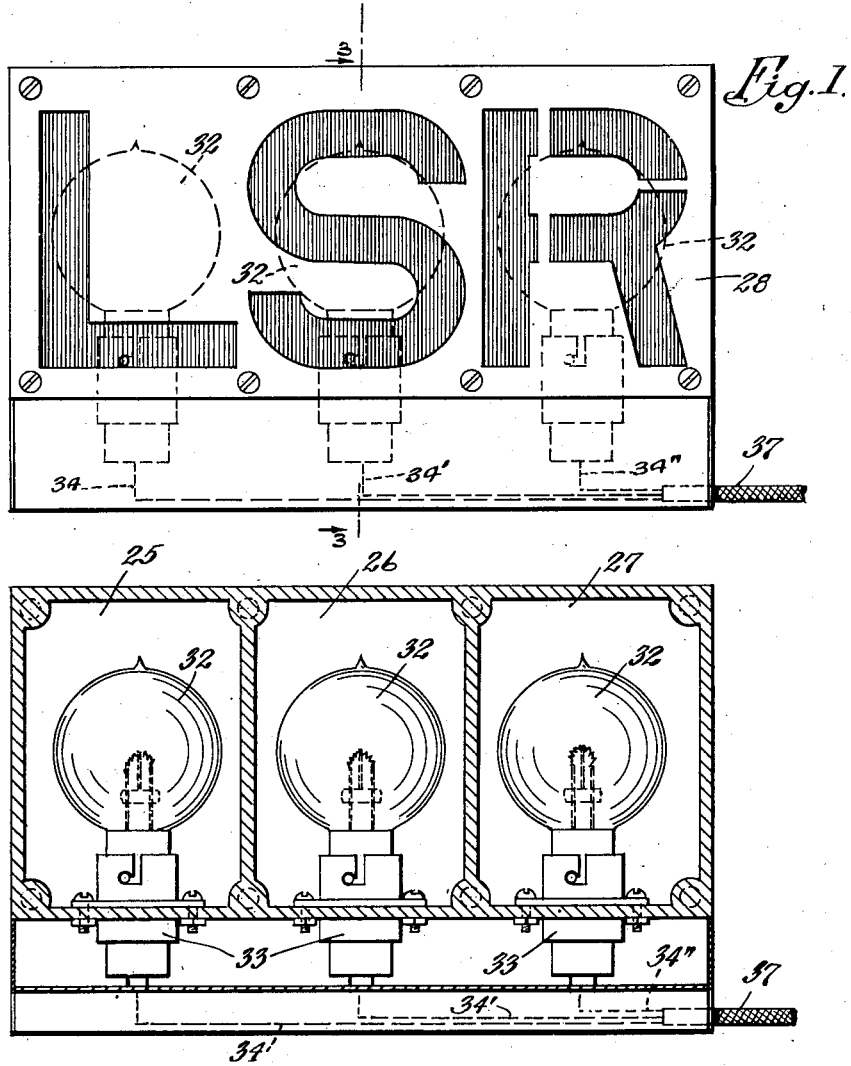

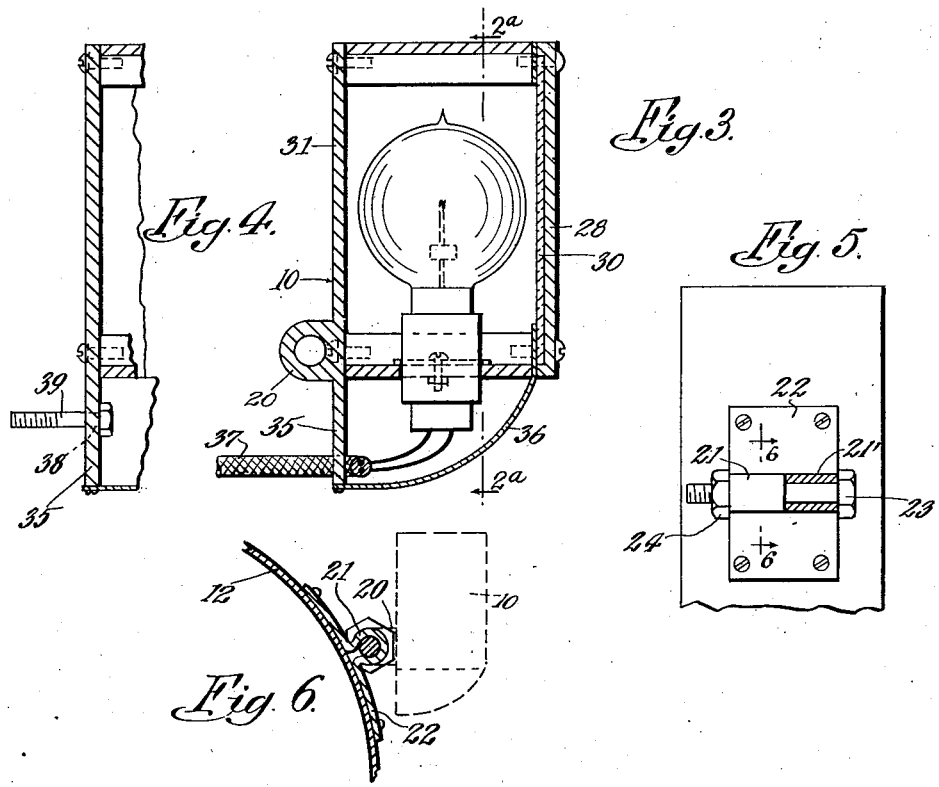
Oct. 27, 1925.
R. E. BOYLE
AUTOMOBILE SIGNAL
Filed Dec. 10, 1921 2 Sheets-Sheet 2
Inventor
Raymond E. Boyle Patented Oct. 27, 1925.

UNITED STATES PATENT OFFICE.

RAYMOND E. BOYLE, OF CHICAGO, ILLINOIS.

AUTOMOBILE SIGNAL.

Application filed December 10, 1921. Serial No. 521,386.

*To all whom it may concern:*

Be it known that I, RAYMOND E. BOYLE, a citizen of the United States, and a resident of the city of Chicago, county of Cook, and State of Illinois, have invented certain new and useful Improvements in Automobile Signals, of which the following is a specification.

My invention relates to new and useful improvements in automobile signals, and has for its object to provide a signalling device having separate means to indicate that the automobile is about to turn to the right or the left, or is about to stop, and to provide means for illuminating said indicating means.

Other objects will appear hereinafter.

The invention consists in the combination and arrangement of parts hereinafter described and claimed.

The invention will be best understood by reference to the accompanying drawings forming a part of this specification, and in which, Fig. 1 is a rear elevational view of the signalling mechanism;

Fig. 2 is a vertical sectional view thereof, at line 2—2 of Fig. 3;

Fig. 3 is a vertical cross section thereof, taken on line 3—3 of Fig. 1;

Fig. 4 is a fragmentary vertical section of the signalling mechanism, showing a modified form of mounting means;

Fig. 5 is a rear view of the fender and the mounting bracket attached thereto; and Fig. 6 is a vertical section of the mounting bracket, at line 6—6 of Fig. 5.

The form of construction illustrated in the drawings comprises a housing 10 provided with means for adjustably mounting it on the automobile fender 12, said means comprises a lug or cuff 20, integral with the housing, and a separate lug or cuff 21 formed integral with and extending half way across a bracket 22 which is fastened on the fender by means of screws, rivets or the like, said bracket is provided with a space 21' at the side of said cuff 21 for receiving the cuff 20 of the housing. A bolt 23 passes through said cuffs 20 and 21 and is provided with a nut 24 to clamp said cuffs together and frictionally retain said housing in place, after it has been set or adjusted in position to display the signals in the desired rearward direction.

The housing 10 is further provided with a plurality of chambers or compartments 25, 26 and 27. In the drawings I have shown three (3) chambers, as best seen in Fig. 2. A plate or closing member 28 is removably fastened over the rear open ends of said chambers by means of screws or similar fastening elements and openings are provided in said plate 28, in the form of letters or characters, one for each chamber, for the purpose of indicating an intended turn or stop of the automobile. In the drawings I have shown the plate provided with the letter "L" on the left hand chamber 25, the letter "S" on the middle chamber 26, and the letter "R" on the right hand chamber 27, to indicate a turn to the left, a stop, and a turn to the right, respectively; and a red glass 30 is mounted on the inside of said plate 28 over said openings, in order to display a proper warning signal to the vehicle following. A plate 31 is removably fastened over the side of said housing adjoining the automobile, said plate having the lug or cuff 20, for mounting said housing, integral therewith.

Means for illuminating the signal openings or letters are provided in the form of electric lights 32, there being one light in each chamber, said lights being of any suitable form and size. Each light is mounted in the lower wall of its chamber, in a socket 33, the outer part of which has electric contacts with the housing 10, and is thereby grounded on the automobile, and the inner part of which is connected to an electric conductor 34 beneath said wall, and the lower ends of the sockets being housed and protected by a flange 35 extending below said chambers from said plate 31, and a curved closing plate 36 extending from the lower end of said flange to the lower rear corner of the housing. Said conductors extend through a flexible conduit or covering 37 to the contact members on the steering wheel 13.

In the modified form of mounting means shown in Fig. 4, the sleeve 20 and the bracket 22 are omitted and openings 38 are provided in the flange 35, through which bolts 39 extend for fastening the signalling mechanism, to the license plate or similar part at the rear of the automobile.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:—

1. An automobile signalling device comprising a housing having a plurality of chambers; a plate removably mounted on said housing, forming the rear walls of said chambers; an opening provided in said plate for each chamber, one of said openings signalling a stop and the others signalling a turn of the automobile; a glass mounted inside of said plate over all of said openings; a light in each chamber for illuminating said glass to clearly display the signals; an extension on the front wall of said housing; and a covering plate leading from said extension to the inner side of said rear wall plate and said glass, and being held by said plate and glass, said extension and covering plate serving to house the connections of said lights with their electric conductors, substantially as described.

2. An automobile signalling device comprising a housing having a plurality of spaced side and intermediate walls forming a plurality of chambers; a removable rear wall on said housing, said wall being provided with a signal opening for each chamber; an electric light in each of said chambers for illuminating its respective opening; a forward wall removably mounted on said housing and provided with a downward extension; means for fastening said front and said rear walls in position; a covering plate leading from the bottom of said extension, to said rear wall to be held thereby, and means for retaining the covering plate in place at both the front and the rear of the housing, said extension and plate serving to house connections of said lights with their respective conductors.

In testimony whereof I have signed my name to this specification.

RAYMOND E. BOYLE.